United States Patent
Muppirala et al.

(10) Patent No.: US 8,893,146 B2
(45) Date of Patent: Nov. 18, 2014

(54) METHOD AND SYSTEM OF AN I/O STACK FOR CONTROLLING FLOWS OF WORKLOAD SPECIFIC I/O REQUESTS

(75) Inventors: Kishore Kumar Muppirala, Karnataka (IN); Narayanan Ananthakrishnan Nellayi, Karnataka (IN); Sumanesh Samanta, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1365 days.

(21) Appl. No.: 12/645,492

(22) Filed: Dec. 23, 2009

(65) Prior Publication Data

US 2011/0119679 A1    May 19, 2011

(30) Foreign Application Priority Data

Nov. 13, 2009    (IN) ............................. 2793/CHE/2009

(51) Int. Cl.
- G06F 9/46 (2006.01)
- G06F 15/173 (2006.01)
- G06F 3/00 (2006.01)
- G06F 13/00 (2006.01)
- G06F 3/06 (2006.01)

(52) U.S. Cl.
CPC ............ G06F 3/0611 (2013.01); G06F 3/0659 (2013.01); G06F 3/0689 (2013.01)
USPC ........... 718/105; 718/104; 718/103; 709/224; 709/225; 709/226; 711/148; 711/111; 711/112; 710/56; 710/57; 710/58; 710/59; 710/60; 710/5

(58) Field of Classification Search
USPC ......................................................... 718/105
See application file for complete search history.

(56) References Cited

U.S. PATENT DOCUMENTS

| | | | |
|---|---|---|---|
| 6,636,909 B1 * | 10/2003 | Kahn et al. ...................... | 710/60 |
| 8,145,806 B2 * | 3/2012 | Lee et al. ......................... | 710/39 |
| 8,510,451 B2 * | 8/2013 | Wada ............................. | 709/227 |
| 2003/0046473 A1 * | 3/2003 | Dobson et al. ................ | 710/306 |
| 2004/0044846 A1 * | 3/2004 | Matthews et al. ............. | 711/113 |
| 2004/0194095 A1 * | 9/2004 | Lumb et al. ................... | 718/100 |
| 2007/0043854 A1 * | 2/2007 | Shum et al. ................... | 709/224 |
| 2007/0208849 A1 * | 9/2007 | Ely et al. ....................... | 709/224 |
| 2007/0280110 A1 * | 12/2007 | Murphy et al. ............... | 370/235 |
| 2009/0216959 A1 * | 8/2009 | Allison et al. ................ | 711/149 |
| 2009/0259749 A1 * | 10/2009 | Barrett et al. ................. | 709/224 |
| 2009/0259752 A1 * | 10/2009 | McNutt et al. ................ | 709/225 |
| 2010/0011129 A1 * | 1/2010 | Bita ................................ | 710/5 |
| 2010/0191876 A1 * | 7/2010 | Muppirala et al. ............. | 710/39 |
| 2010/0250785 A1 * | 9/2010 | Shin et al. ........................ | 710/3 |
| 2011/0080917 A1 * | 4/2011 | Stevenson et al. ............ | 370/401 |
| 2011/0119679 A1 * | 5/2011 | Muppirala et al. ............ | 718/105 |

\* cited by examiner

Primary Examiner — Abdullah Al Kawsar

(57) ABSTRACT

A method and system of a host device hosting multiple workloads for controlling flows of I/O requests directed to a storage device is disclosed. In one embodiment, a type of a response from the storage device reacting to an I/O request issued by an I/O stack layer of the host device is determined. Then, a workload associated with the I/O request is identified among the multiple workloads based on the response to the I/O request. Further, a maximum queue depth assigned to the workload is adjusted based on the type of the response, where the maximum queue depth is a maximum number of I/O requests from the workload which are concurrently issuable by the I/O stack layer.

20 Claims, 9 Drawing Sheets

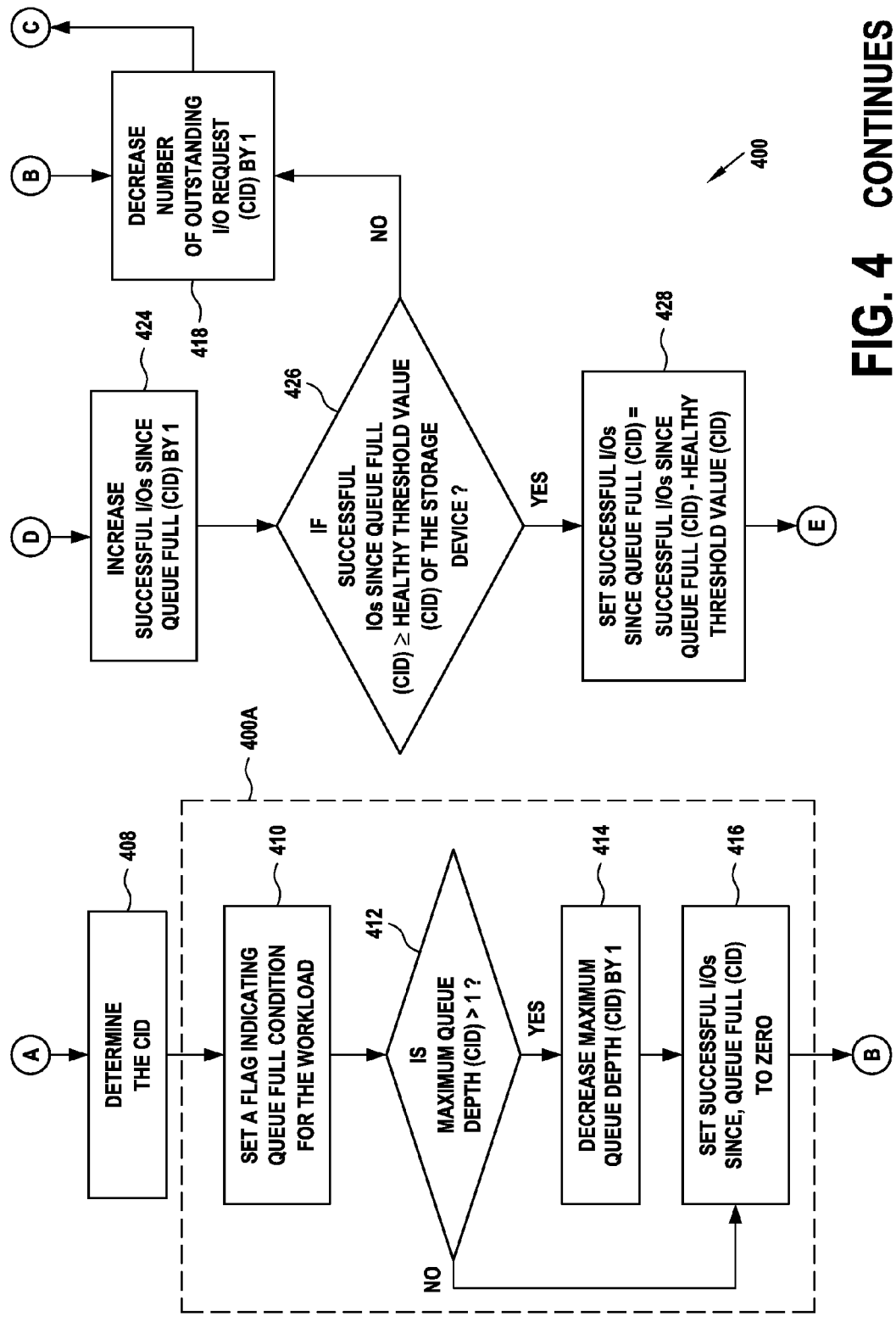
FIG. 4 CONTINUES

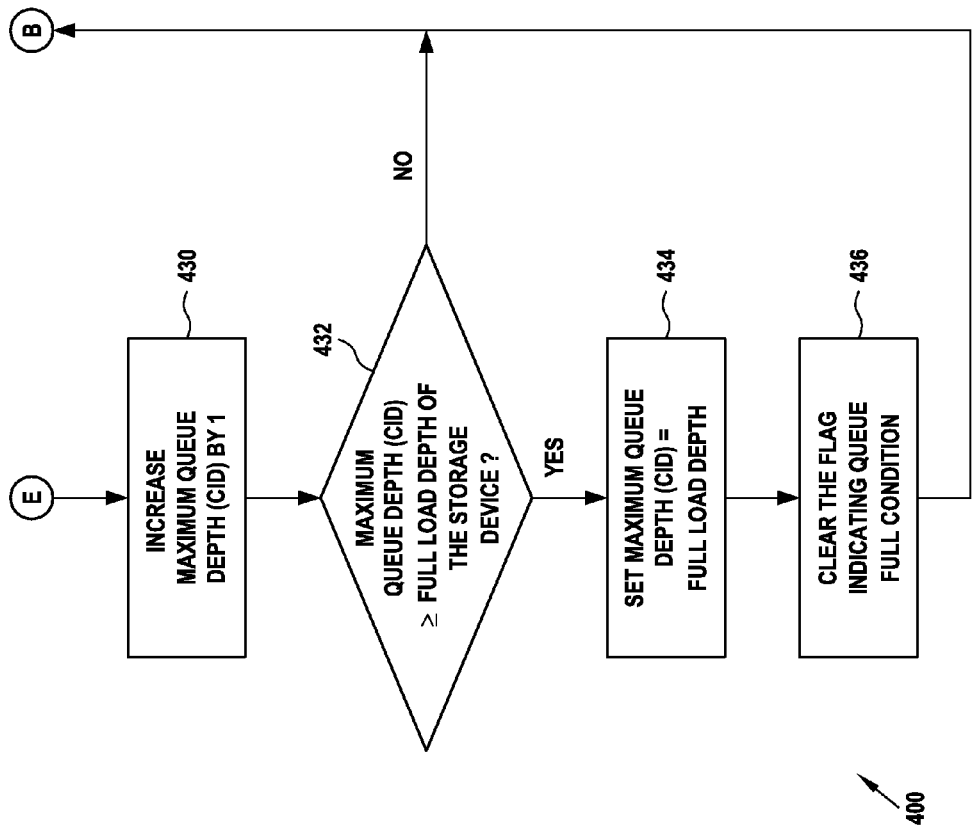
FIG. 4 CONTINUES

METHOD AND SYSTEM OF AN I/O STACK FOR CONTROLLING FLOWS OF WORKLOAD SPECIFIC I/O REQUESTS

RELATED APPLICATIONS

Benefit is claimed under 35 U.S.C. 119(a)-(d) to Foreign application Serial No. 2793/CHE/2009 entitled "METHOD AND SYSTEM OF AN I/O STACK FOR CONTROLLING FLOWS OF WORKLOAD SPECIFIC I/O REQUESTS" by Hewlett-Packard Development Company, L.P., filed on Nov. 13, 2009, which is herein incorporated in its entirety by reference for all purposes

BACKGROUND

In a storage area network having multiple host devices and a storage array, an input/output (I/O) stack layer, such as a disk driver, may be a computer program which allows one or more workloads or applications accessing a host device to interact with a disk in the disk array. The I/O stack layer may communicate with the disk through a computer bus or communications subsystem to which the disk is connected. When a workload invokes one or more I/O requests to the disk, the I/O stack layer may issue respective commands to the disk. Once the disk sends a response back to the I/O stack layer reacting to one of the I/O requests, the I/O stack layer may invoke routines in the workload, thus relinquishing control back to the workload The disk may be also equipped with a queue or queues to deal with multiple I/O requests issued by the I/O stack layer of the host device as well as corresponding I/O stack layers of other host devices in the storage area network. On the host side, a number of I/O requests concurrently being issued by the I/O stack layer may be limited by a maximum queue depth, where the maximum queue depth may refer to a maximum number of I/O requests or commands which can be concurrently issued by the I/O stack layer. At each queue of the disk, the multiple I/O requests from the host device may wait to be serviced by the disk.

Therefore, if the maximum queue depth set in the host device is too small, the I/O stack layer may issue too few I/O requests at a time, thus resulting in lower throughput and inefficient usage of the disk. On the other hand, if the maximum queue depth is too large for the disk to handle, it may slow down the disk servicing the I/O requests. Furthermore, if one of the multiple workloads hosted by the host device causes a "queue full" condition at the disk, it may prevent the host device from issuing an additional I/O request from other workloads hosted by the host device until the queue full condition is cleared. This may significantly reduce the I/O throughput of the storage area network.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follow.

DETAILED DESCRIPTION

A method and system for controlling flows of I/O requests is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms "classifier" and "classifier identifier" are used interchangeably throughout the document.

Figure 1:
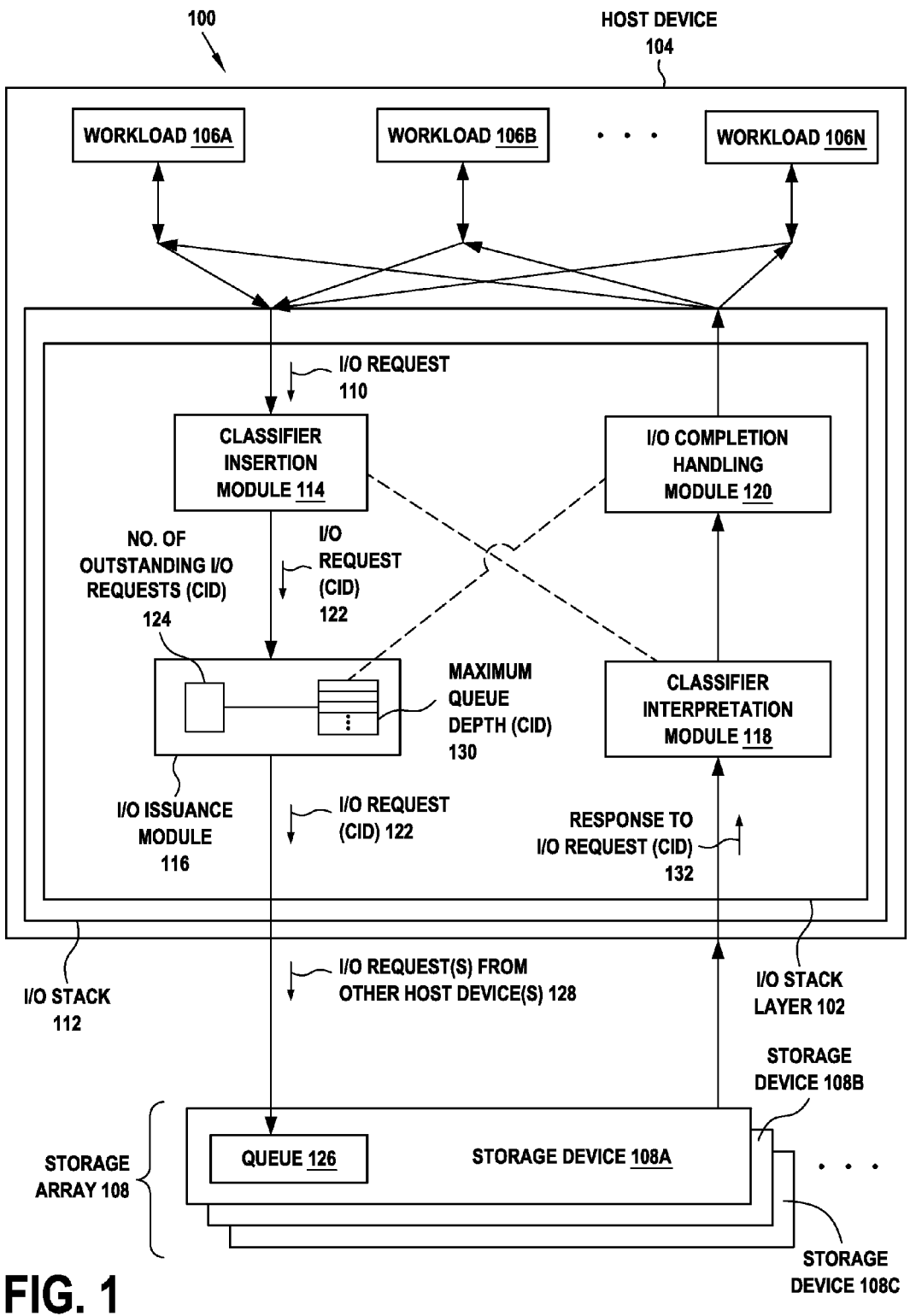
FIG. 1 illustrates a storage network system with an exemplary I/O stack layer system on a host device for controlling a flow of I/O requests to a storage device, according to one embodiment.

FIG. 1 illustrates a storage network system 100 with an exemplary I/O stack layer system on a host device 104 for controlling a flow of I/O requests to a storage device 108A, according to one embodiment. In FIG. 1, the storage network system 100 includes the host device 104 and a storage array 108 coupled to the host device 104. The host device 104 may be a server, a work station, a file server and so on. The host device 104 may host multiple workloads 106A-N, for example, applications, that interact with the storage array 108. In one example implementation, an individual workload of the workloads 106A-N may be a single application with a particular priority assigned to it. In another example implementation, an individual workload of the workloads 106A-N may be multiple applications sharing a same priority assigned to them.

It can be noted that, although the workloads 106A-N are shown to be locally implemented on the host device 104, the workloads 106A-N may be remote applications hosted by the host device 104. Also, the host device 104 includes an I/O stack 112 having an I/O stack layer 102. In one embodiment, the I/O stack layer 102 may be implemented in a hypervisor or operating system (O/S) of the host device 104. As illustrated, the I/O stack layer 102 includes a system comprising a classifier insertion module 114, an I/O issuance module 116, a classifier interpretation module 118 and an I/O completion handling module 120. The storage device 108A of the storage array 108 as well as storage devices 108B and 108C may be a quality of service (QoS) enabled storage device.

In one example operation, a workload 106A of the multiple workloads 106A-N may invoke an I/O request 110 to the storage device 108A. When the I/O request 110 is invoked, the I/O stack layer 102 may issue an I/O request with classifier identifier (CID) 122 to the storage device 108A. In one exemplary operation, the classifier insertion module 114 may insert a classifier to the I/O request 110 associated with the workload 106A. For example, each classifier may be associated with relative QoS priority of various workloads. Thus, the I/O request (CID) 122 is generated and is forwarded to the I/O issuance module 116.

The I/O issuance module 116 may issue the I/O request (CID) 122 to the storage device 108A when a number of outstanding I/O requests (CID) 124 associated with the workload 106A is less than a maximum queue depth (CID) 130 assigned to the workload 106A. The number of outstanding I/O requests (CID) 124 may include the I/O requests issued by the I/O issuance module 116 but yet to be executed by the storage device 108A. The maximum queue depth (CID) 130 may be a maximum number of I/O requests from the workload 106A which are concurrently issuable by the I/O issuance module 116.

The I/O request (CID) 122 issued by the I/O issuance module 116 may wait in the queue 126 to be processed by the storage device 108A. The queue 126, coupled between the I/O stack layer 102 and the storage device 108A, may be used to deal with the I/O request (CID) 122 on the storage device side. The queue 126 may also receive I/O request(s) from other host device(s) 128. It is noted that each storage device, such as a disk, in the storage array 108 may have an associated queue which deals with multiple I/O requests.

Upon processing the I/O request (CID) 122, the storage device 108A may forward a response to the I/O request (CID) 132 to the classifier interpretation module 118 of the I/O stack layer 102. The response may indicate a successful execution of the I/O request (CID) 122 by the storage device 108A or a queue full condition of the storage device 108A. The queue full condition may refer to a condition when the number of outstanding I/O requests (CID) 124 is greater than a full load depth or capability of the storage device 108A, which may depend on the size of the queue 126. That is, the queue full condition may ensue when the queue 126 is overflown with the incoming I/O requests.

Upon receiving the response 132, the classifier interpretation module 118 may identify the workload 106A which invoked the I/O request 110. In one embodiment, the classifier interpretation module 118 identifies the workload 106A based on the classifier associated with the I/O request (CID) 122. Further, based on the response to the I/O request (CID) 132, the I/O completion handling module 120 adjusts, for example, increases or decreases, the maximum queue depth (CID) 130. That is, by decreasing the maximum queue depth (CID) 130, the issuance of I/O requests associated with the CID may be slowed down. In contrast, by increasing the maximum queue depth (CID) 120, the issuance of I/O requests associated with the CID may speed up.

Figure 2:
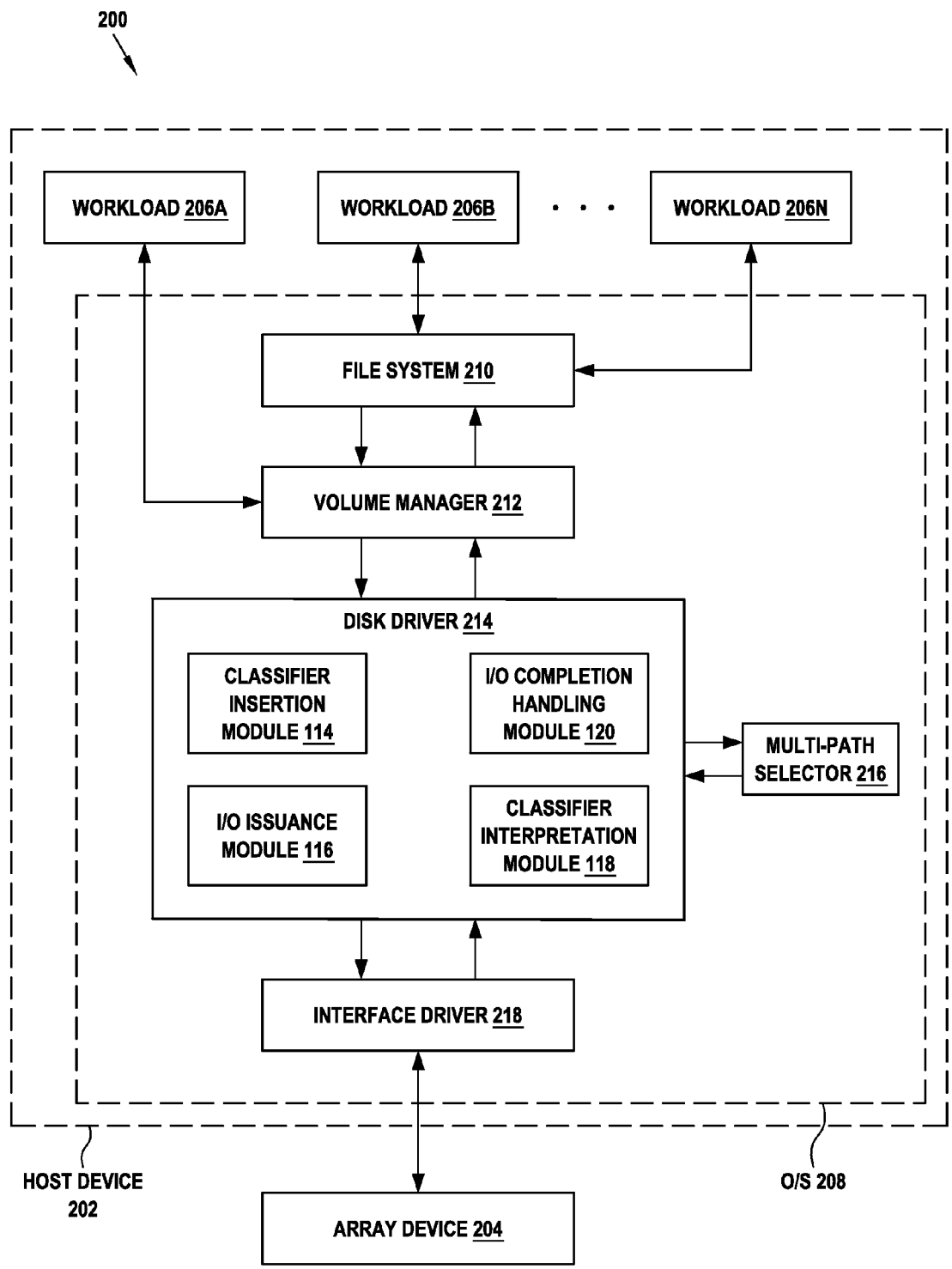
FIG. 2 illustrates a disk driver implementing the exemplary I/O stack layer system of FIG. 1, according to one embodiment.

FIG. 2 illustrates a disk driver 214 implementing the exemplary I/O stack layer system of FIG. 1, according to one embodiment. As illustrated in FIG. 2, a host device 202 is coupled to an array device 204. The host device 202 includes multiple workloads 206A-N and an operating system (OS) 208. The OS 208 includes a file system 210, a volume manager 212, the disk driver 214, a multi-path selector 216 and an interface driver 218.

The file system 210, which sits on top of the volume manager 212, may store and organize computer files and data so as to make it easy to find and access them. The volume manger 212 may allocate space on the array device 204 by concatenating, striping together or otherwise combining partitions into larger virtual ones that can be resized or moved while the array device 204 is being used. The disk driver 214 may allow the multiple workloads 206A-N to interact with the array device 204. The workloads 206B and 206N may interact with the file system 210. It is also further noted that one or more of the workloads 206A-N may directly interact with the disk driver 214. When one of the workloads 206A-N invokes an I/O request in the disk driver 214, the disk driver 214 may issue one or more I/O requests with a CID associated with the workload to the array device 204.

The multi-path selector 216 may figure out if there are multiple paths to a particular array device, such as the array device 204, in terms of multiple hardware adapters, in terms of multiple switches, which may reside in the network, or multiple controllers on the array device. The multi-path selector 216 may aggregate all these paths and provides an optimal path to the array device. The interface driver 218 may manage an interface card which may be operating at a unique data transfer rate.

It is noted that the I/O stack layer system implemented in the disk driver 214 is an example embodiment of the I/O stack layer system of FIG. 1. Thus, upon receiving a response from the array device 204, the disk driver 214 may identify one of the workloads 206A-N and may adjust a maximum queue depth assigned to the workload. In this manner, the disk driver 214 implements adaptive handling of I/O requests invoked by the workload using the classifier insertion module 114, the I/O issuance module 116, classifier interpretation module 118 and the I/O completion handling module 120, which are explained in greater detail in FIG. 1.

Figure 3:
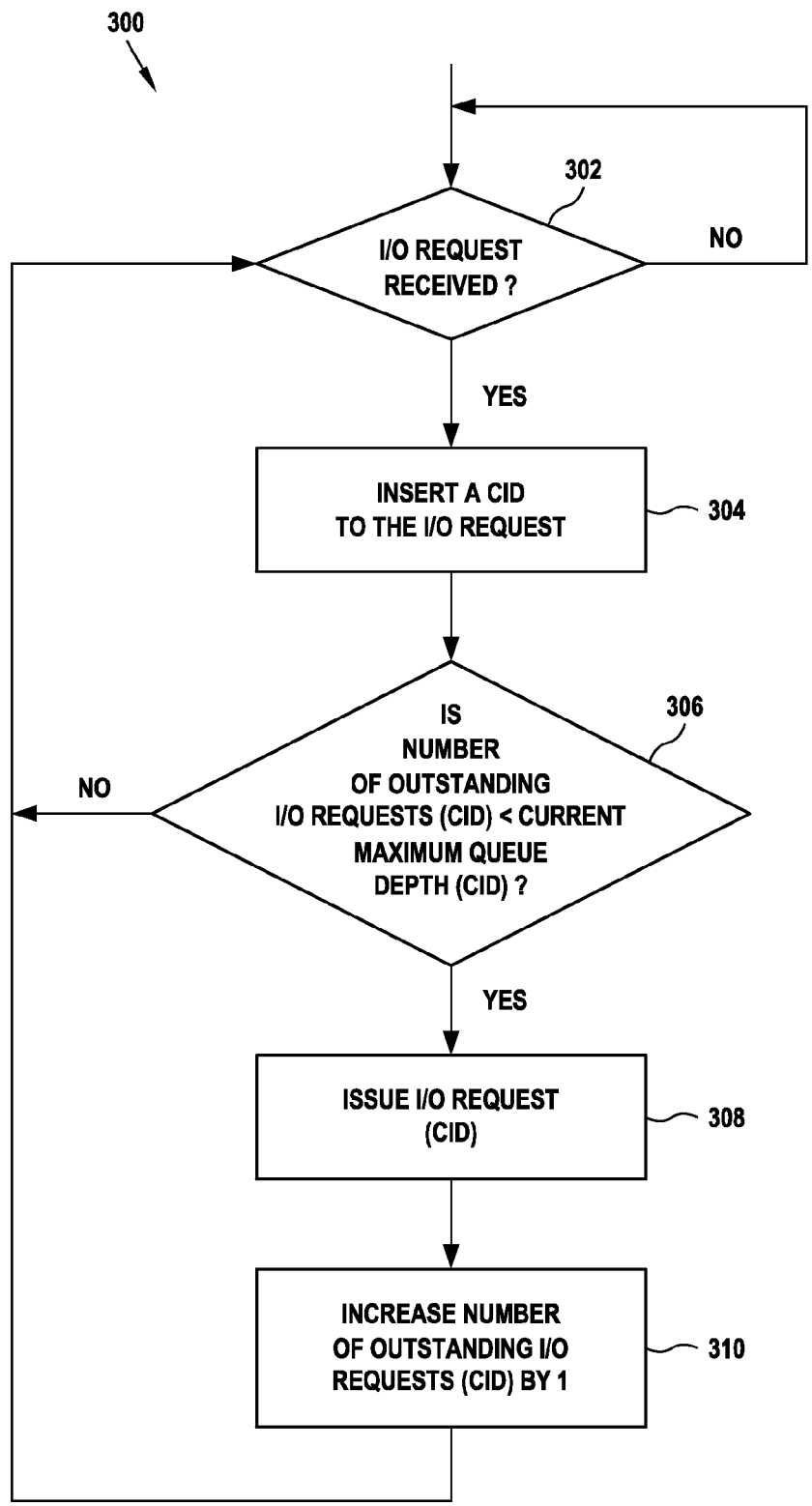
FIG. 3 illustrates a computer implemented flow diagram of an exemplary method performed by the I/O stack layer system of FIG. 1 for issuing an I/O request, according to one embodiment.

FIG. 3 illustrates a computer implemented flow diagram of an exemplary method 300 performed by the I/O stack layer system of FIG. 1 for issuing an I/O request, according to one embodiment. It is noted that the method 300 may be performed by the classifier insertion module 114 and the I/O issuance module 116. At step 302, it is checked whether an I/O request, such as the I/O request 110, is received from one of multiple workloads, such as the multiple workloads 106A-N. If the I/O request is received, then step 304 is performed. Otherwise, it is checked whether any I/O request is received from any of the multiple workloads. At step 304, a CID is inserted to the I/O request received from a workload, for example the workload 106A, thus generating the I/O request associated with the workload. In one example embodiment, the CID inserted to the I/O request may help identify the workload associated with the I/O request, as described below.

At step 306, it is determined whether a number of outstanding I/O requests associated with the workload is less than a current maximum queue depth assigned to the workload. For example, the no. of outstanding I/O requests (CID) 124 may be compared with the maximum queue depth (CID) 130. If the number of outstanding I/O requests is less than the current maximum queue depth, then step 308 is performed. Otherwise, step 302 is performed again. At step 308, the I/O request with the CID, such as the I/O request (CID) 122, is issued by the I/O stack layer of a host device to a storage device coupled to the host device. At step 310, the number of outstanding I/O requests associated with the workload is increased by one since an additional I/O request (CID) has been issued. Exemplary pseudo-code for issuing an I/O request is found in Appendix "A".

Figure 4:
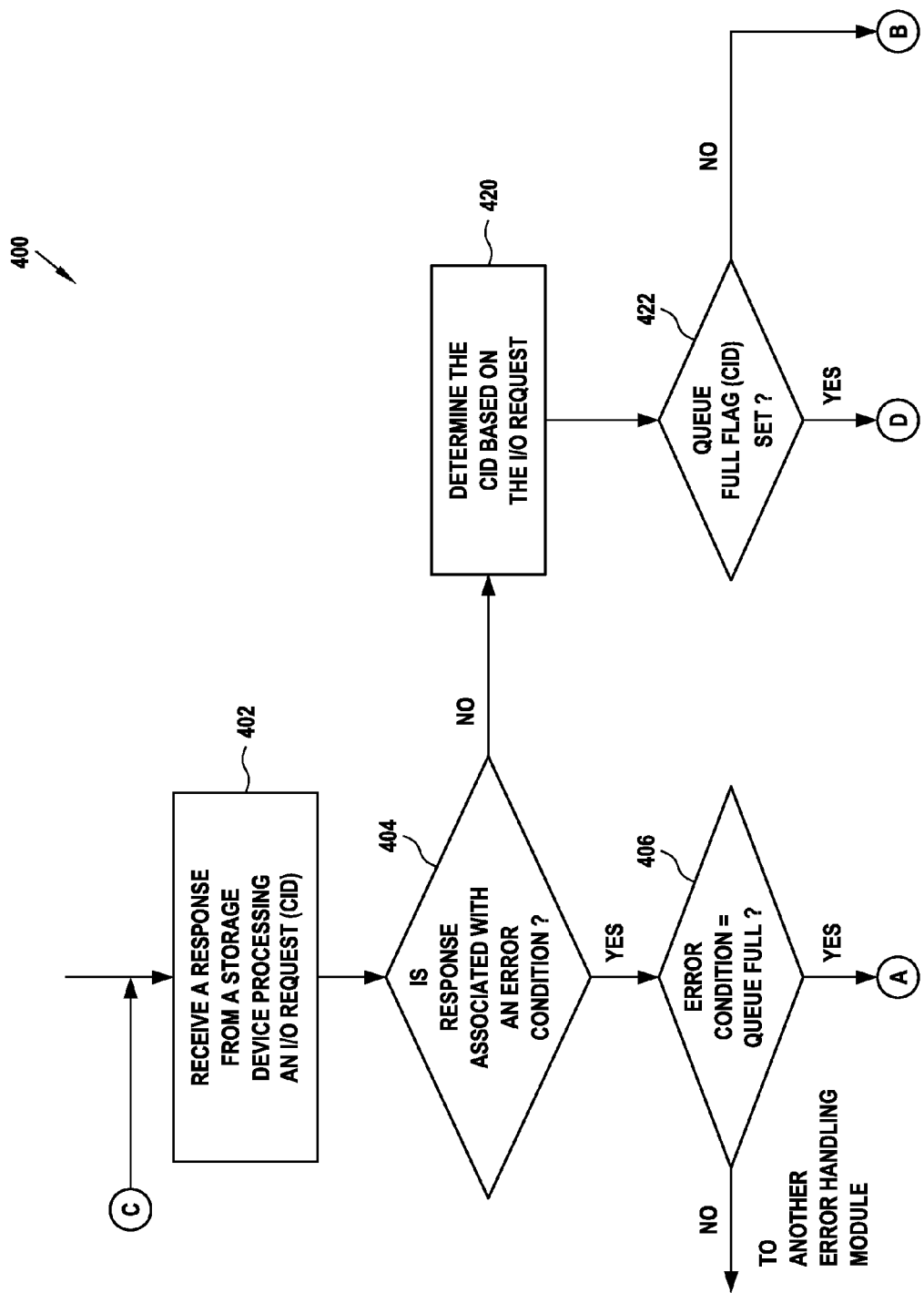
FIG. 4 illustrates a computer implemented flow diagram of an exemplary method performed by the I/O stack layer system of FIG. 1 for handling a response to an I/O request, according to one embodiment.

FIG. 4 illustrates a computer implemented flow diagram of an exemplary method 400 performed by the I/O stack layer system of FIG. 1 for handling a response to an I/O request, according to one embodiment. It is noted that the method 400 may be performed by the classifier interpretation module 118 and the I/O completion handling module 120. At step 402, a response is received from a storage device processing an I/O request (CID) associated with a workload. For example, the response is generated by the storage device 108A reacting to the I/O request 110 invoked by the workload 106A and issued by the I/O stack layer 102 as the I/O request (CID) 122. At step 404, it is determined whether the response is associated with an error condition. If the response is associated with an error condition, then step 406 is performed.

At step 406, it is checked whether the error condition returned by the storage device is a queue full condition. If the error condition is the queue full condition, then step 408 is performed. If the error condition is not the queue full condition, then the error condition is handled by another error handling module. At step 408, the CID associated with the I/O request is determined. In one embodiment, the CID is determined to identify workload associated with the I/O request. At step 410, a flag indicating the queue full condition of the workload is set. At step 412, it is determined whether a maximum queue depth assigned to the workload is greater than one. If it is determined that the maximum queue depth is greater than one at step 412, then step 414 is performed. Otherwise, step 416 is performed.

At step 414, the maximum queue depth assigned to the workload is decreased by one. That is, the maximum number of I/O requests from the workload which are concurrently issuable by the I/O stack layer 102 may be decreased by one. At step 416, successful execution of the I/O requests associated with the workload since the queue full condition is set to zero. At step 418, the number of outstanding I/O requests at the queue of the storage device is decreased by one, and then step 402 is performed again.

If it is determined that the response is not associated with the error condition at step 404, then step 420 is performed. At step 420, the CID associated with the I/O request is determined based on the I/O request associated with the response. At step 422, it is checked whether the flag indicating the queue full condition associated with the workload is set. If the flag indicating the queue full condition is not set, then step 418 is performed. This means that the I/O request associated with the workload is successfully executed at the storage device. At step 418, the number of outstanding I/O requests at the queue of the storage device is decreased by one, and then step 402 is performed again. If the flag indicating the queue full condition is found to be set at step 422, then step 424 is performed. At step 424, a number of successful execution of I/O requests associated with the workload since the queue full condition is increased by one.

At step 426, it is determined whether the number of successful execution of I/O requests associated with the workload since the queue full condition is greater than or equal to a device healthy threshold value of the storage device. It is noted that the device threshold value may be an arbitrary threshold value set by the designer of the I/O flow control algorithm described in the method 400 that once a certain number of I/O requests invoked by a workload are consecutively carried out without incurring any error condition, the maximum queue depth assigned to the workload may be increased by one. If it is determined that the number of successful execution of I/O requests since the queue full condition is greater than or equal to the device healthy threshold value at step 426, then step 428 is performed. Otherwise, step 418 is performed. At step 428, a number of successful execution of I/O requests since the queue full condition is set to a value which is equal to the number of successful execution of I/O requests since the queue full condition minus the device healthy threshold value.

At step 430, the maximum queue depth assigned to the workload is increased by one. At step 432, it is checked whether the maximum queue depth is greater than or equal to the full load depth of the storage device. If the maximum queue depth is greater than or equal to the full load depth of the storage device, then step 434 is performed. It is noted that the full load depth may be a default value shipped with the OS associated with the storage device or an arbitrary value set by the system administrator. Otherwise, step 418 is performed. At step 434, the maximum queue depth is set to a value which is equal to the full load depth of the storage device. At step 436, the flag indicating the queue full condition for the workload is cleared. Subsequently, step 418 is performed. Exemplary pseudo-code for handling a response to a classifier based I/O request is found in Appendix "B".

Figure 5:
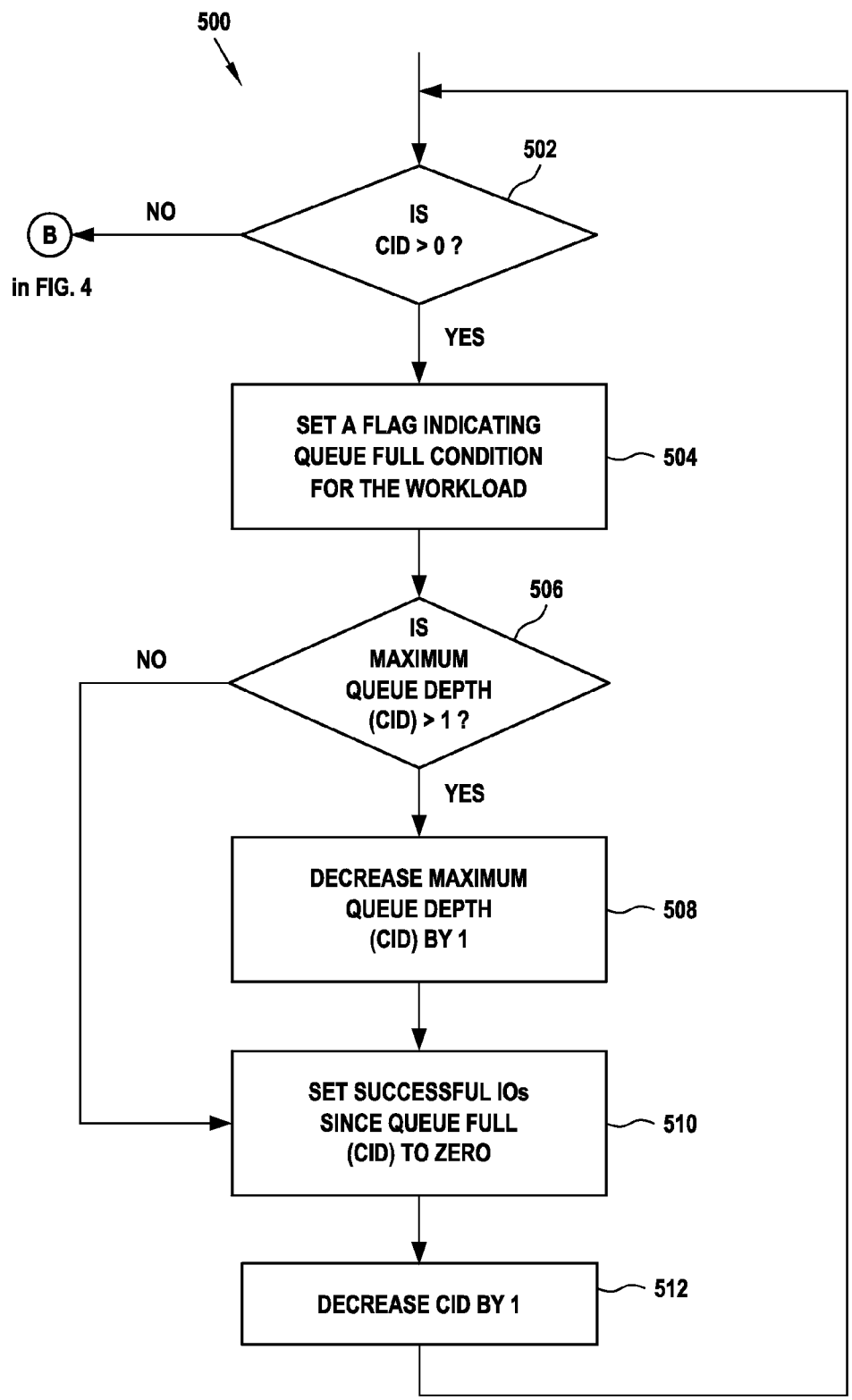
FIG. 5 illustrates a computer implemented flow diagram of an exemplary method performed by the I/O stack layer system of FIG. 1 for handling a queue full condition associated with a workload of a priority and other workloads of lower priorities, according to one embodiment.

FIG. 5 illustrates a computer implemented flow diagram of an exemplary method 500 performed by the I/O stack layer system of FIG. 1 for handling a queue full condition associated with a workload of a priority and other workloads of lower priorities, according to one embodiment. In the embodiment, upon receiving the queue full condition associated with the workload, respective maximum queue depths of those workloads which are of a lower priority than the workload, in addition to the maximum queue depth assigned to the workload, are decreased by one. For example, if workload 'C' has '3' as its CID, where the priority of each workload is directly associated with the value of its CID, workloads 'A' and 'B' which have '1' and '2' as their CIDs, respectively, may be of lower priorities than workload 'C.' Thus, if a queue full condition associated with workload 'C' is received, then the maximum queue depth of workload 'A' and the maximum queue depth of workload 'B' as well as the maximum queue depth of workload 'C' are decreased by one.

In FIG. 5, at step 502, it is determined whether a CID associated with an I/O request issued by a workload is greater than zero. If it is determined that the CID associated with the I/O request issued by the workload is greater than zero at step 502, then step 504 is performed. Otherwise, next response is processed as in step 418 of FIG. 4. At step 504, a flag indicating a queue full condition for the workload is set.

At step 506, it is determined whether the maximum queue depth is greater than one. If it is determined that the maximum queue depth assigned to the workload is greater than one at step 506, then step 508 is performed. Otherwise, step 510 is performed. At step 508, the maximum queue depth assigned to the workload is decreased by one. At step 510, a number of successful execution of I/O requests associated with the workload since the queue full condition is set to zero. At step 512, the CID associated with the I/O request issued by the workload is decreased by one. Then, step 502 is repeated again. Exemplary pseudo-code for handling a queue full condition in response to a prioritized classifier based I/O request is found in Appendix "C".

Figure 6:
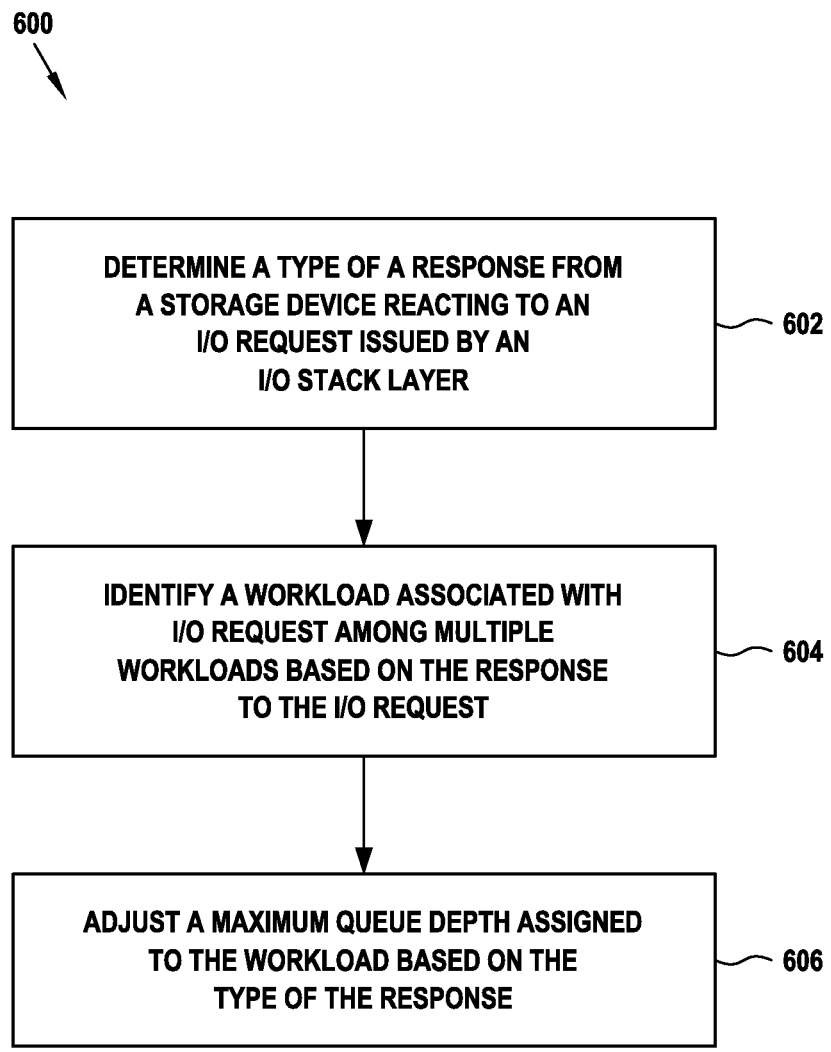
FIG. 6 illustrates a process flow diagram of an exemplary method of an I/O stack layer for handling a response from a storage device reacting to an I/O request issued by the I/O stack layer, according to one embodiment.

FIG. 6 illustrates a process flow diagram of an exemplary method 600 of an I/O stack layer for handling a response from a storage device reacting to an I/O request issued by the I/O stack layer, according to one embodiment. In operation 602, a type of a response from the storage device reacting to an I/O request issued by the I/O stack layer is determined, as in steps 402 and 404 of FIG. 4. In operation 604, a workload associated with the I/O request among the multiple workloads is identified based on the response to the I/O request, as in step

408 and 418 of FIG. 4. In operation 606, a maximum queue depth assigned to the workload is adjusted based on the type of the response, as in step 410-416 and 420-436 of FIG. 4.

Figure 7:
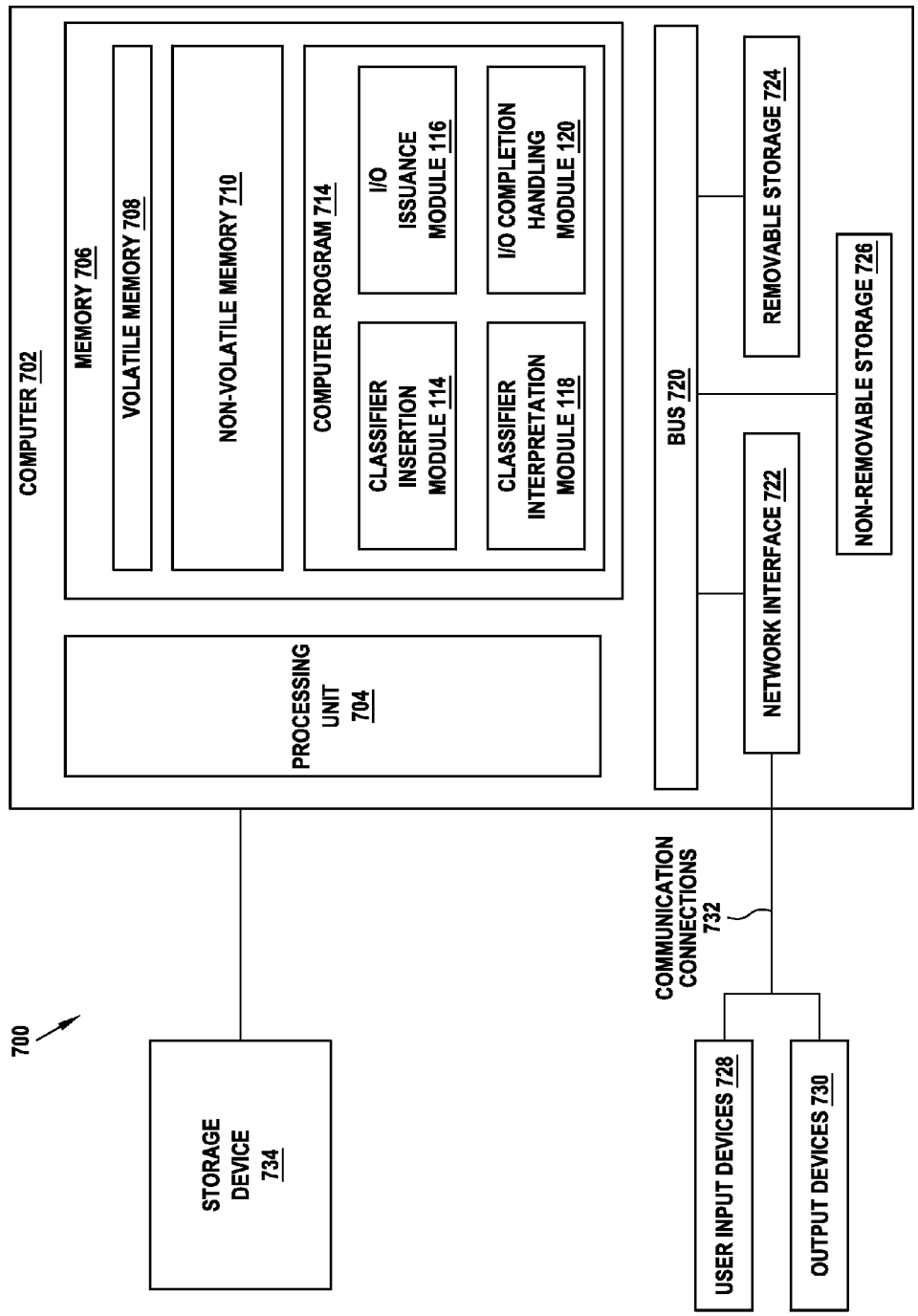
FIG. 7 illustrates an example of a suitable computing system environment for implementing embodiments of the present subject matter.

FIG. 7 shows an example of a suitable computing system environment 700 for implementing embodiments of the present subject matter. FIG. 7 and the following discussion are intended to provide a brief, general description of a suitable computing environment in which certain embodiments of the inventive concepts contained herein may be implemented.

A general computing device, in the form of a computer 702, may include a processing unit 704, a memory 706, a removable storage 724, and a non-removable storage 726. The computer 702 additionally includes a bus 720 and a network interface 722. The computer 702 may include or have access to a computing environment that includes one or more user input devices 728, one or more output devices 730, and one or more communication connections 732 such as a network interface card or a universal serial bus connection. It is appreciated that, the computer 702 is an exemplary embodiment of the host device 104 of FIG. 1 and the host device 202 of FIG. 2 respectively.

The one or more user input devices 728 may be a digitizer screen and a stylus and the like. The one or more output devices 730 may be a display device of computer, a computer monitor, and the like. The computer 702 may operate in a networked environment using the communication connection 732 to connect to one or more remote computers or other host devices. A remote computer may include a personal computer, a server, a work station, a router, a network personal computer, a peer device or other network nodes, and/or the like. The communication connection 732 may include a local area network, a wide area network, and/or other networks.

The memory 706 may include a volatile memory 708 and a non-volatile memory 710. A variety of computer-readable media may be stored in and accessed from the memory elements of the computer 702, such as the volatile memory 708 and the non-volatile memory 710, the removable storage 724 and the non-removable storage 726. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processing unit 704, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 704 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts.

Machine-readable instructions stored on any of the above-mentioned storage media may be executable by the processing unit 704 of the computer 702. For example, a computer program 714 may include machine-readable instructions capable of handling a queue full condition of a storage device 734 coupled to the computer 702, according to the teachings and herein described embodiments of the present subject matter. In one embodiment, the computer program 714 may be included on a CD-ROM and loaded from the CD-ROM to a hard drive in the non-volatile memory 710. The machine-readable instructions may cause the computer 702 to encode according to the various embodiments of the present subject matter.

As shown, the computer program 714 includes the classifier insertion module 114, the I/O issuance module 116, the classifier interpretation module 118 and the I/O completion handling module 120. The classifier insertion module 114 may insert a classifier to an I/O request issued by a workload among multiple workloads (not shown) hosted on the computer 702, such as a host device. It is noted that the workloads may be applications locally or remotely hosted by the computer 702. The I/O issuance module 116 may issue an I/O request to the storage device 734 when a number of outstanding I/O requests associated with the workload at a queue of the storage device 734 is less than a maximum queue depth assigned to the workload. The classifier interpretation module 118 may identify the workload upon receiving a response from the storage device 734 reacting to the I/O request to the storage device 734. The I/O completion handling module 120 may adjust the maximum queue depth assigned to the workload based on the type of the response.

For example, the computer-readable medium of an I/O stack layer of the computer 702, for example, a host device, hosting multiple workloads and coupled to the storage device 734 for handling a queue full condition of the storage device 734 has instructions that, when executed by the computer 702, may cause the computer 702 to perform a method, in which the queue full condition is received from the storage device 734 in response to an I/O request from a workload hosted by the computer 702 and issued to the storage device 734. Then, the workload associated with the I/O request is identified among the multiple workloads. Further, a maximum queue depth assigned to the workload is decreased. The operation of the computer 702 for handling the queue full condition of the storage device 734 is explained in greater detail with reference to FIGS. 1-7.

The technique presented here may work even if the storage device 734 does not have the ability to classify/identify the CID associated with the IO request. In such a case, a general "queue full" condition returned by the storage device 734 can be smartly interpreted by the IO stack layer 102 of FIG. 1 to ensure higher priority workloads get their IOs processed/issued ahead of the lower priority workloads using the technique presented in paragraph [0034] above (owing to higher priority queues not getting throttled).

In various embodiments, the methods and systems described in FIGS. 1 through 7 enable the I/O stack of an OS or a hypervisor to adapt to a queue full reporting by a storage device which supports multi-priority quality of service. The methods and systems ensures that the queue full condition of the storage device for a particular workload does not affect I/O requests invoked by other workloads.

APPENDIX "A" depicts the Pseudo-code for issuing an I/O request.

APPENDIX "B" depicts the Pseudo-code for setting a flag indicating a queue full condition.

APPENDIX "C" depicts the Pseudo-code for handling a queue full condition of a storage device.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

APPENDIX A

```
begin    ...
    cid = lookup_classifier_for_the_io_request( );
    if num_req_outstanding[cid] < cur_max_queue_depth[cid] then
        // Bump-up the current number of outstanding IOs with the
        device, which
        // is the current deemed queue depth for the device for this
        workload
        num_req_outstanding[cid] ++;
        Issue the IO to the lower layer
    endif
end
```

APPENDIX B

```
begin    ....
    if error condition returned by the device then
        if error condition is Queue Full then
            cid = lookup_classifier_for_the_io_request( );
            queue_full_occured[cid] = true;
            if cur_max_queue_depth[cid] > 1 then
                cur_max_queue_depth[cid] --; // device got busy
                for this
                                    // workload
            endif
            successful_ios_since_qfull[cid] = 0; // start counting
                again!
        endif
    else
        // No errors on the IO
        cid = lookup_classifier_for_the_io_request( );
        if queue_full_occured[cid] then
            // count the number of successful IOs since last Qfull.
            successful_ios_since_qfull[cid] ++;
        // device_healthy_threshold is the number of IOs that need to
        successfully
        // execute since previous queue full condition to assume that
        the workload
        // can issue more IOs.
            if successful_ios_since_qfull[cid] >=
            device_healthy_threshold[cid]
                then
                successful_ios_since_qfull[cid] =
                    successful_ios_since_qfull[cid] -
                        device_healthy_threshold [cid];
                cur_max_queue_depth[cid]++;
                if cur_max_queue_depth[cid] >=
                FULL_LOAD_QDEPTH
                    then cur_max_queue_depth[cid] =
                    FULL_LOAD_QDEPTH;
                    queue_full_occured[cid] = false;
                endif
            endif
        endif
    endif
    num_req_outstanding[cid] --;
end
```

APPENDIX C

```
if error condition returned by the device then
    if error condition is Queue Full then
        P = lookup_classifier_for_the_io_request( );
```

APPENDIX C-continued

```
        for( all cid <= P) do
            queue_full_occured[cid] = true
            if cur_max_queue_depth[cid] > 1 then
                cur_max_queue_depth[cid] --; // device got busy
                for this
            // workload
            // let us reduce our max loading threshold
            endif
            successful_ios_since_qfull[cid] = 0; // start counting
                again!
        endfor
    endif
endif
```

What is claimed is:

1. A method of a host device hosting multiple workloads for controlling flows of input/output requests directed to a storage device, the method comprising:
  receiving a response from the storage device reacting to an input/output request issued by an input/output stack layer of the host device, a type of the response indicating a condition at the storage device, wherein the type of the response is configured to indicate one of a queue full condition of the storage device and a successful execution of the input/output request by the storage device;
  identifying a workload associated with the response to the input/output request from among the multiple workloads; and
  adjusting a maximum queue depth assigned to the identified workload based on the type of the response, wherein the maximum queue depth is a maximum number of input/output requests from the identified workload which are concurrently issuable by the input/output stack layer.

2. The method of claim 1, wherein the input/output request is issued by the input/output stack layer when a number of outstanding input/output requests associated with the identified workload is less than the maximum queue depth assigned to the identified workload.

3. The method of claim 2, wherein the number of outstanding input/output requests associated with the identified workload is increased by one when the input/output request is issued by the input/output stack layer.

4. The method of claim 1, wherein the identifying the workload associated with the input/output request comprises:
  looking up a classifier identifier associated with the input/output request upon receiving the response, wherein the classifier identifier is inserted to the input/output request issued by the input/output stack layer to identify the identified workload; and
determining the identified workload based on the classifier.

5. The method of claim 1, wherein the adjusting the maximum queue depth comprises decreasing the maximum queue depth when the response indicates the queue full condition.

6. The method of claim 5, wherein the adjusting the maximum queue depth further comprises decreasing a respective maximum queue depth of each workload in the multiple workloads which is of lower priority than the identified workload.

7. The method of claim 1, further comprising decreasing a number of outstanding input/output requests at a queue of the storage device.

8. The method of claim 1, wherein the host device comprises corresponding maximum queue depths for the multiple workloads, the maximum queue depths being independent of each other.

9. The system of claim 8, wherein the input/output stack layer is implemented in one of an operating system of the host device and a hypervisor of the host device.

10. The method of claim 1,
wherein the adjusting the maximum queue depth comprises, when the type of the response indicates the successful execution of the input/output request by the storage device, increasing the maximum queue depth when a number of successful execution of input/output requests associated with the workload since a queue full condition is greater than a device healthy threshold value and when the maximum queue depth is less than a full load depth of the storage device.

11. The method of claim 1,
wherein the adjusting the maximum queue depth comprises, when the type of the response indicates the successful execution of the input/output request by the storage device, setting the maximum queue depth equal to a full load depth of the storage device when a number of successful execution of input/output requests associated with the identified workload since the queue full condition is greater than a device healthy threshold value and when the maximum queue depth is equal to or greater than the full load depth of the storage device.

12. The method of claim 1, wherein issuance of input/output requests associated with a classifier identifier of the workload are slowed down by decreasing the maximum queue depth.

13. The method of claim 1, wherein issuance of input/output requests associated with a with a classifier identifier of the workload speed up by increasing the maximum queue depth.

14. A system of a host device hosting multiple workloads for controlling flows of input/output requests directed to a storage device, the system comprising:
a processing unit;
an input/output issuance module for issuing an input/output request to the storage device when a number of outstanding input/output requests associated with a workload is less than a maximum queue depth assigned to the workload, wherein the maximum queue depth is a maximum number of input/output requests from the workload which are concurrently issuable by an input/output stack layer of the host device;
a classifier insertion module for inserting a classifier to the input/output request to identify the workload, the classifier indicating relative priority of the multiple workloads;
a classifier interpretation module for identifying the workload upon receiving a response from the storage device reacting to the input/output request to the storage device, wherein a type of the response is configured to indicate one of a queue full condition of the storage device and a successful execution of the input/output request by the storage device; and
an input/output completion handling module for adjusting the maximum queue depth assigned to the workload based on a type of the response.

15. The system of claim 14, wherein the input/output stack layer comprises a disk driver of the operating system associated with the storage device.

16. The system of claim 14,
wherein the adjusting the maximum queue depth comprises, when the type of the response indicates the successful execution of the input/output request by the storage device, increasing the maximum queue depth when a number of successful execution of input/output requests associated with the workload since a queue full condition is greater than a device healthy threshold value and when the maximum queue depth is less than a full load depth of the storage device.

17. The system of claim 14,
wherein the adjusting the maximum queue depth comprises, when the type of the response indicates the successful execution of the input/output request by the storage device, setting the maximum queue depth equal to a full load depth of the storage device when a number of successful execution of input/output requests associated with the identified workload since the queue full condition is greater than a device healthy threshold value and when the maximum queue depth is equal to or greater than the full load depth of the storage device.

18. A non-transitory computer readable medium of an input/output stack layer of a computer hosting multiple workloads and coupled to a storage device for handling a queue full condition of the storage device having instructions that, when executed by the computer, cause the computer to perform a method comprising:
receiving the queue full condition from the storage device in response to an input/output request from a workload hosted by the host device, the input/output request issued to the storage device;
identifying the workload associated with the response to the input/output request from among the multiple workloads based on a classifier indicating relative priority of the multiple workloads; and
decreasing a maximum queue depth assigned to the workload, wherein the maximum queue depth is a maximum number of input/output requests from the workload which are concurrently issuable by the input/output stack layer.

19. The instructions of claim 18, wherein a type of the response is configured to indicate one of a queue full condition of the storage device and a successful execution of the input/output request by the storage device, and when the type of the response indicates the successful execution of the input/output request by the storage device, increasing the maximum queue depth when a number of successful execution of input/output requests associated with the workload since a queue full condition is greater than a device healthy threshold value and when the maximum queue depth is less than a full load depth of the storage device.

20. The instructions of claim 18, wherein a type of the response is configured to indicate one of a queue full condition of the storage device and a successful execution of the input/output request by the storage device, and when the type of the response indicates the successful execution of the input/output request by the storage device, setting the maximum queue depth equal to a full load depth of the storage device when a number of successful execution of input/output requests associated with the identified workload since the queue full condition is greater than a device healthy threshold value and when the maximum queue depth is equal to or greater than the full load depth of the storage device.

* * * * *

UNITED STATES PATENT AND TRADEMARK OFFICE
CERTIFICATE OF CORRECTION

| | |
|---|---|
| PATENT NO. | : 8,893,146 B2 |
| APPLICATION NO. | : 12/645492 |
| DATED | : November 18, 2014 |
| INVENTOR(S) | : Kishore Kumar Muppirala et al. |

It is certified that error appears in the above-identified patent and that said Letters Patent is hereby corrected as shown below:

In the Claims

In column 11, line 1, in Claim 9, delete "system" and insert -- method --, therefor.

Signed and Sealed this
Twenty-sixth Day of May, 2015

Michelle K. Lee
*Director of the United States Patent and Trademark Office*